(12) United States Patent
Masada et al.

(10) Patent No.: US 8,434,810 B2
(45) Date of Patent: May 7, 2013

(54) SURROUNDING STRUCTURE OF STORAGE COMPARTMENT OF INSTRUMENT PANEL

(75) Inventors: Keiichi Masada, Hamamatsu (JP); Tomonari Fujita, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 265 days.

(21) Appl. No.: 12/938,928

(22) Filed: Nov. 3, 2010

(65) Prior Publication Data
US 2011/0109113 A1  May 12, 2011

(30) Foreign Application Priority Data

Nov. 6, 2009  (JP) ................................. 2009-254757

(51) Int. Cl.
*B60R 21/045* (2006.01)

(52) U.S. Cl.
USPC ..... 296/72; 280/752; 296/37.12; 296/187.05; 296/193.02

(58) Field of Classification Search .................. 280/752; 296/29, 37.12, 70, 72, 73, 187.05, 193.02
See application file for complete search history.

(56) References Cited

U.S. PATENT DOCUMENTS

| | | | | |
|---|---|---|---|---|
| 2,287,404 A * | 6/1942 | Zerk | .................... | 62/244 |
| 3,606,447 A * | 9/1971 | Ryding | .................... | 296/37.12 |
| 4,109,955 A * | 8/1978 | Amann et al. | ............... | 296/37.1 |
| 5,275,456 A * | 1/1994 | Ishii et al. | .................. | 296/37.12 |
| 5,431,442 A * | 7/1995 | Tomita et al. | ................ | 280/752 |
| 5,577,770 A * | 11/1996 | Sinner et al. | .................. | 280/752 |
| 5,810,414 A * | 9/1998 | Choquet | .................... | 296/37.12 |
| 6,250,669 B1 * | 6/2001 | Ohmiya | ........................ | 280/732 |
| 6,276,109 B1 * | 8/2001 | Hingorani et al. | ........... | 52/716.5 |
| 7,210,704 B2 * | 5/2007 | Ko | ................ | 280/748 |
| 7,311,327 B2 * | 12/2007 | Yamazaki | ..................... | 280/752 |
| 7,703,829 B2 * | 4/2010 | Miki | ............................... | 296/72 |
| 8,104,819 B2 * | 1/2012 | Biggs et al. | ..................... | 296/72 |
| 8,127,962 B2 * | 3/2012 | Kogami | ..................... | 220/348 |
| 8,146,986 B2 * | 4/2012 | Bierkamp et al. | ........ | 296/193.02 |
| 8,181,991 B2 * | 5/2012 | Dei et al. | ........................ | 280/752 |
| 8,246,074 B2 * | 8/2012 | Choi et al. | ................. | 280/728.2 |
| 8,251,399 B2 * | 8/2012 | Babian | .......................... | 280/752 |
| 2003/0173763 A1 * | 9/2003 | Yamazaki et al. | ............ | 280/748 |
| 2006/0232055 A1 * | 10/2006 | Cappabianca et al. | ........ | 280/752 |
| 2007/0182188 A1 * | 8/2007 | Penner et al. | .............. | 296/37.12 |

(Continued)

FOREIGN PATENT DOCUMENTS

| | | | |
|---|---|---|---|
| JP | 05185894 A | * | 7/1993 |
| JP | 2001-071819 B2 | | 3/2001 |
| JP | 2003-104130 A | | 4/2003 |

*Primary Examiner* — Glenn Dayoan
*Assistant Examiner* — Paul Chenevert
(74) *Attorney, Agent, or Firm* — Alston & Bird LLP

(57) ABSTRACT

A surrounding structure of a recessed storage compartment of an instrument panel, including the compartment formed in the instrument panel, includes a steering support member extending in a vehicle width direction on a forward position of a front wall of the compartment, and an attachment piece protruding frontward from the front wall. The attachment piece has an attachment portion abutting the support member. A U-shaped cutout is formed in the attachment portion to be opened on a front edge of the attachment portion or on a rear edge of the attachment portion. The attachment piece is fastened to the support member by a fastening member inserted into the cutout. A cross-sectional center of the support member is arranged above a top edge or below a bottom edge of the front wall.

4 Claims, 4 Drawing Sheets

U.S. PATENT DOCUMENTS

2007/0267857 A1* 11/2007 Jonsson ............ 280/752
2008/0106110 A1* 5/2008 Miki et al. ............ 296/37.12
2011/0187145 A1* 8/2011 Ishikawa ............ 296/37.12
2012/0038181 A1* 2/2012 Yamazaki ............ 296/72

* cited by examiner

SURROUNDING STRUCTURE OF STORAGE COMPARTMENT OF INSTRUMENT PANEL

FIELD OF THE INVENTION

The present invention relates to a surrounding structure of a storage compartment of an instrument panel, which is supported by a steering support member in a vehicle.

BACKGROUND OF THE INVENTION

Typically, an instrument panel (hereinafter referred to as an "I-panel") of a vehicle such as an automobile, or the like, is provided with a storage compartment such as a glove box, upper tray, or the like. This storage compartment is formed so as to be recessed toward a front of the vehicle, as seen from the inside of a vehicle cabin. In addition, a member extending in a vehicle width direction, is provided on the back side of the I-panel. In some cases, structures in which a front wall of the storage compartment and the I-panel are supported by this member, are adopted.

For example, in Japanese Patent Publication No. 3619072, in order to support an upper tray constituting the storage compartment in the condition of high rigidity, and in order to support the I-panel, the front wall of the upper tray is attached to a member by a bracket in the condition of high rigidity.

Furthermore, in Unexamined Japanese Patent Application Publication No. 2003-104130, an upper tray constituting the storage compartment, is configured to be easily deformed so that a force applied to the upper tray can be absorbed. For this purpose, a front wall of the upper tray formed in a substantial box shape, is attached to a member positioned in a forward position of the front wall, and border portions and corner portions of the upper tray of the substantial box shape is formed thin so that fragile portions are provided.

BRIEF SUMMARY OF THE INVENTION

A recent vehicle such as an automobile, or the like, is required to absorb the force applied from the inside of the vehicle cabin to the I-panel when the force is applied. However, in Japanese Patent Publication No. 3619072, since the upper tray of the I-panel is supported by the member in the condition of high rigidity, the force applied to the I-panel cannot be absorbed sufficiently.

Furthermore, in Publication of Unexamined Japanese Patent Application No. 2003-104130, when the force is applied from the inside of the vehicle cabin to the I-panel, the front wall of the upper tray is separated along the fragile portions of the border portions and the corner portions, and then moves toward the inside of the vehicle cabin. As a result, items stored within the upper tray may be thrown out to the vehicle cabin, and this is a problem.

The present invention has been conceived in consideration of such circumstances, and an object of the present invention is to provide a surrounding structure of a storage compartment of an instrument panel, which can efficiently absorb the force applied from the inside of the vehicle cabin to the I-panel and can prevent the items stored within the storage compartment from being thrown out to the vehicle cabin.

To solve the problems, regarding a surrounding structure of a storage compartment of an instrumental panel in the present invention, the surrounding structure of a storage compartment of an instrument panel including the storage compartment formed in an instrument panel of a vehicle so as to be recessed toward a front of the vehicle, comprises a steering support member extending in a vehicle width direction on a forward position of a front wall of the storage compartment, and an attachment piece protruding from the front wall toward the front of the vehicle. The attachment piece has an attachment portion abutting the steering support member, the attachment portion is provided with a U-shaped cutout part formed to be opened on a front edge or a rear edge of the attachment portion, the attachment piece is configured to be fastened to the steering support member by a fastening member inserted into the cutout part of the attachment portion, and a cross-sectional center of the steering support member is arranged above a top edge of the front wall or below a bottom edge of the front wall.

Regarding the surrounding structure of the storage compartment of the instrumental panel in the present invention, a portion of the attachment piece continuous with the front wall of the storage compartment, is thin to form a fragile portion.

Regarding the surrounding structure of the storage compartment of the instrumental panel in the present invention, a border portion of the storage compartment which is positioned in an edge portion of the front wall on a side of an arrangement position of the steering support member, is formed to be curved toward the front of the vehicle.

Regarding the surrounding structure of the storage compartment of the instrumental panel in the present invention, the border portion of the storage compartment is formed with a smaller thickness than any other walls of the storage compartment.

According to the present invention, the following advantageous effects can be achieved.

A surrounding structure of a storage compartment of an instrument panel according to the present invention, including the storage compartment formed in an instrument panel of a vehicle so as to be recessed toward a front of the vehicle, includes a steering support member extending in a vehicle width direction on a forward position of a front wall of the storage compartment, and an attachment piece protruding from the front wall toward the front of the vehicle. The attachment piece has an attachment portion abutting the steering support member, the attachment portion is provided with a U-shaped cutout part formed to be opened on a front edge or a rear edge of the attachment portion, the attachment piece is configured to be fastened to the steering support member by a fastening member inserted into the cutout part of the attachment portion, and a cross-sectional center of the steering support member is arranged above a top edge of the front wall or below a bottom edge of the front wall.

Accordingly, the storage compartment of the instrument panel is securely supported by the steering support member in the normal condition. When the force is applied from the inside of the vehicle cabin to the instrument panel in this normal condition, is transmitted to the storage compartment, and acts on the storage compartment, the storage compartment moves while deforming the attachment piece attached to the steering support member, or moves after uncoupling from the steering support member. Furthermore, since the cross-sectional center of the steering support member is arranged above the top edge of the front wall or below the bottom edge of the front wall, the storage compartment uncoupled from the steering support member, moves to a position below or above the steering support member. Therefore, the steering support member does not receive the force applied to the storage compartment, and the steering support member can make the force escape to the front of the vehicle. As a result, the force applied from the inside of the vehicle cabin to the instrument panel, can be efficiently absorbed. In addition, since the front wall of the storage compartment is not pushed by the steering support member, the front wall is prevented from moving to the inside of the vehicle cabin, and the items stored within the storage compartment are prevented from being thrown out to the vehicle cabin.

Regarding the surrounding structure of the storage compartment of the instrumental panel in the present invention, a portion of the attachment piece continuous with the front wall of the storage compartment, is thin to form a fragile portion. Therefore, the attachment piece is easily deformed. This can help the storage compartment to move while deforming the attachment piece attached to the steering support member or to move after uncoupling from the steering support member. As a result, the advantageous effects described above, can be attained more efficiently.

Regarding the surrounding structure of the storage compartment of the instrumental panel in the present invention, a border portion of the storage compartment which is positioned in an edge portion of the front wall on a side of an arrangement position of the steering support member, is formed to be curved toward the front of the vehicle. Therefore, the storage compartment can be helped to move to a position above or below the steering support member so as not to contact the steering support member. As a result, the effects described above, can be attained more efficiently.

Regarding the surrounding structure of the storage compartment of the instrumental panel in the present invention, the border portion of the storage compartment is formed in a smaller thickness than any other walls of the storage compartment. This can make it less likely for the storage compartment to be deformed when the instrument panel is molded, so that the storage compartment can be formed in a shape exactly as intended. As a result, the effects described above can be attained more effectively.

DETAILED DESCRIPTION OF THE DRAWINGS

A description is given below of a surrounding structure of a storage compartment of an instrument panel (hereinafter referred to as an "I-panel") in each of the embodiments of the present invention. In the embodiments of the present invention, an upper tray is used as an example for describing the storage compartment in the I-panel; however, the storage compartment is not limited to the upper tray. The storage compartment may be a glove box or other storage compartments, as long as advantageous effects similar to those of the embodiments of the present invention can be attained. Furthermore, a right hand drive vehicle is described in the embodiments of the present invention; however, the vehicle is not limited to the right hand drive vehicle, but may be a left hand drive vehicle as an example.

First Embodiment

A surrounding structure of a storage compartment of an instrument panel in a first embodiment of the present invention, is described as below.

Figure 1:
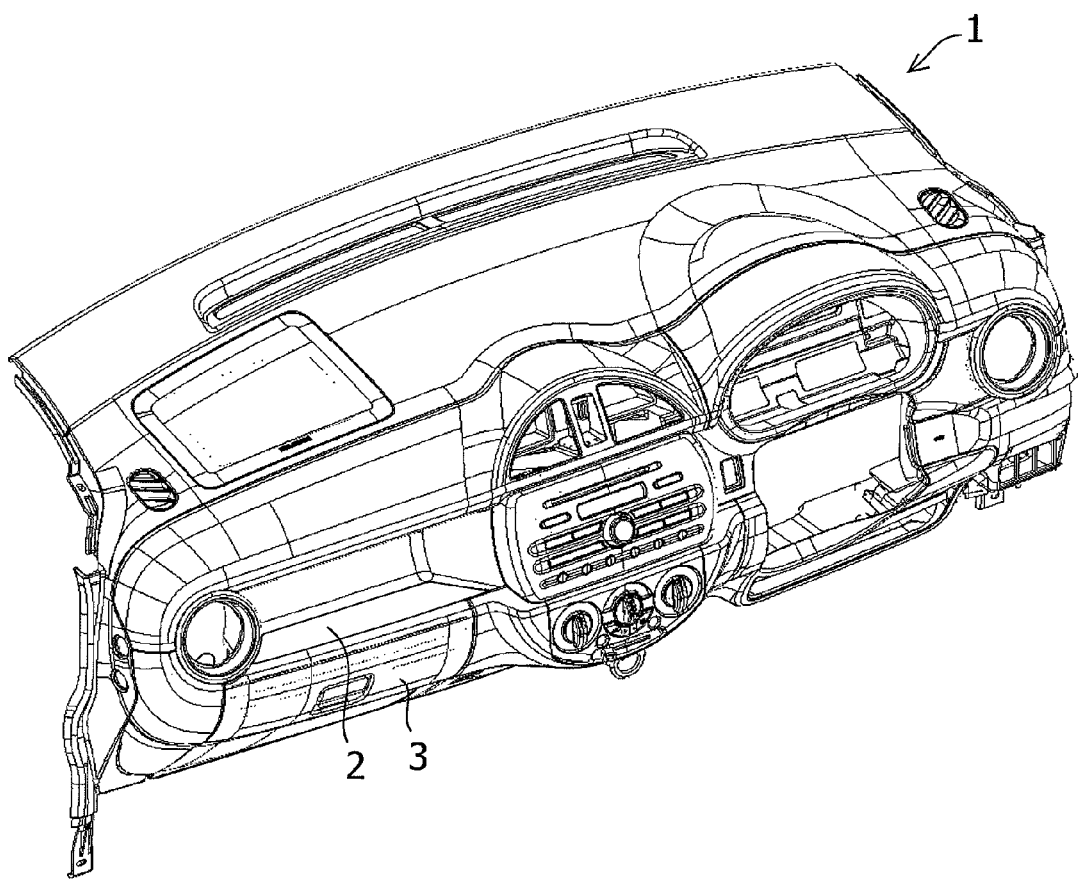
FIG. 1 is a perspective view showing an outer appearance of an instrument panel which is seen from the inside of a vehicle cabin, in a first embodiment of the present invention.

As shown in FIG. 1, an I-panel 1 is arranged in the front of a driver seat and a front passenger seat (not shown) in the vehicle. The I-panel 1 is manufactured with a resin molding. In the front of the front passenger seat, an upper tray 2 is arranged in the I-panel 1 as a storage compartment. The upper tray 2 is formed in a substantial box shape which is recessed toward the front of the vehicle. A glove box 3 is arranged below the upper tray 2.

Figure 2:
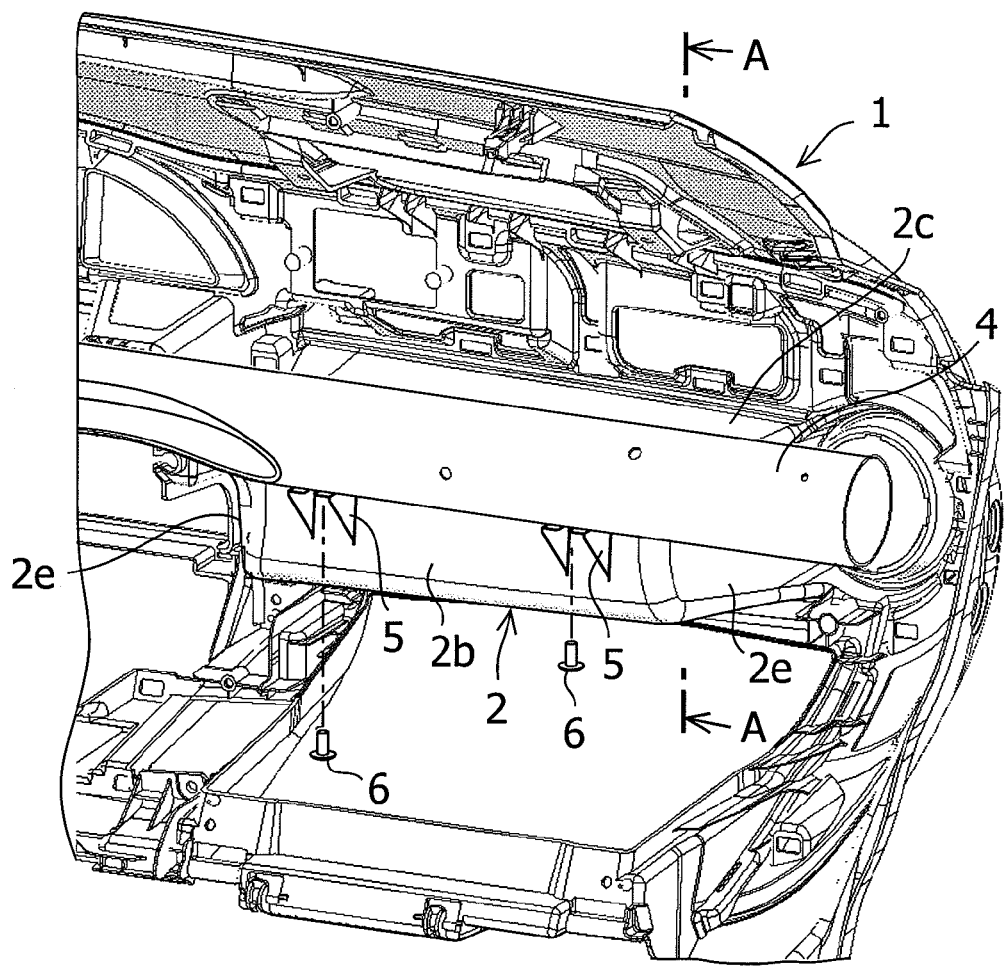
FIG. 2 is a perspective view of the instrument panel which is seen from a back side thereof, in the first embodiment of the present invention.
Figure 3:
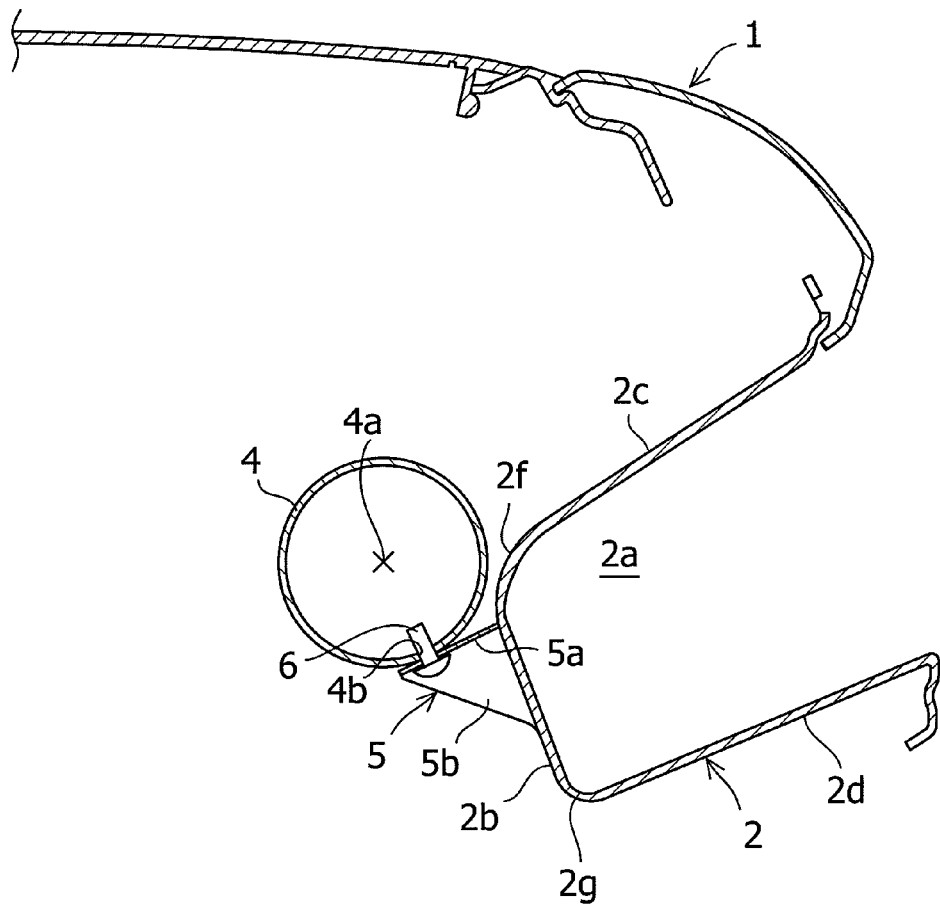
FIG. 3 is a cross-sectional view along section A-A of FIG. 2.

Referring to FIG. 2 and FIG. 3, the upper tray 2 has a front wall 2b, a top wall 2c, a bottom wall 2d, and paired side walls 2e, which define a storage space 2a inside of the upper tray 2. A border portion 2f between the front wall 2b and the top wall 2c, and a border portion 2g between the front wall 2b and the bottom wall 2d, are respectively formed to curve toward the front of the vehicle. These border portions 2f and 2g are respectively formed with a smaller thickness than any of the front wall 2b, the top wall 2c, the bottom wall 2d, and the side walls 2e.

Figure 4:
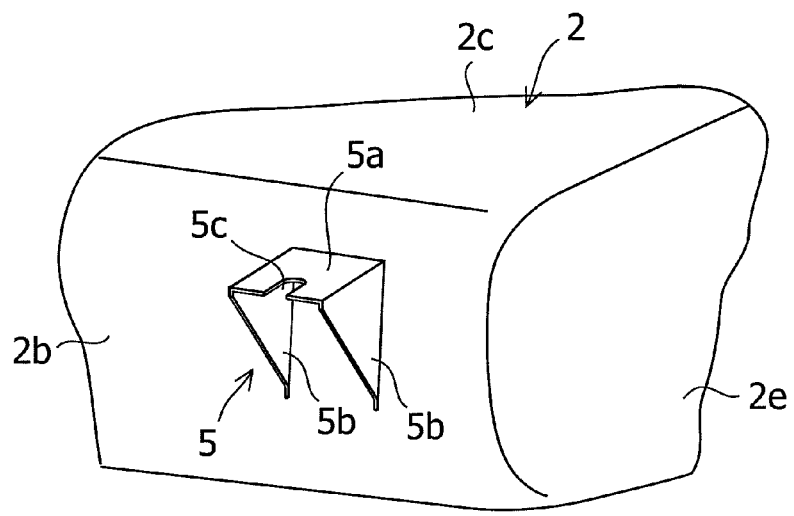
FIG. 4 is a perspective view in which an attachment piece of the instrument panel depicted in FIG. 2 is shown enlarged.

A pipe-like steering support member (hereinafter referred to as "S-member") 4 extending in a vehicle-width direction, is provided on a forward position of the upper tray 2. A cross-sectional center 4a of the S-member 4 is arranged above a top edge of the front wall 2b of the upper tray 2. Attachment pieces 5 for attaching the S-member 4 are provided on a front face of the front wall 2b so as to protrude toward the front of the vehicle. Referring to FIG. 4, each attachment piece 5 is provided with an attachment portion 5a on a top edge thereof and with triangular rib portions 5b. The attachment portion 5a extends from the front wall 2b in the same direction as the direction in which the upper tray 2 is recessed, and the triangular rib portions 5b extend between the front wall 2b and respective both vehicle-width-direction edges of the attachment portion 5a. The attachment portion 5a is provided with a U-shaped cutout part 5c formed to be opened on a front edge of the attachment portion 5a. A portion of the attachment piece 5, continuous with the front wall 2b of the upper tray 2, is thin to form a fragile portion.

Referring back to FIG. 2 and FIG. 3, the attachment portion 5a of the attachment piece 5 is configured to contact the S-member 4. The S-member 4 is provided with a screw hole 4b corresponding to the cutout part 5c of the attachment piece 5. A screw 6, which is a fastening member, is inserted into the cutout part 5c, and then fastening the screw 6 to the screw hole 4b, so that the attachment portion 5a of the attachment piece 5 is attached to the S-member.

Figure 5:
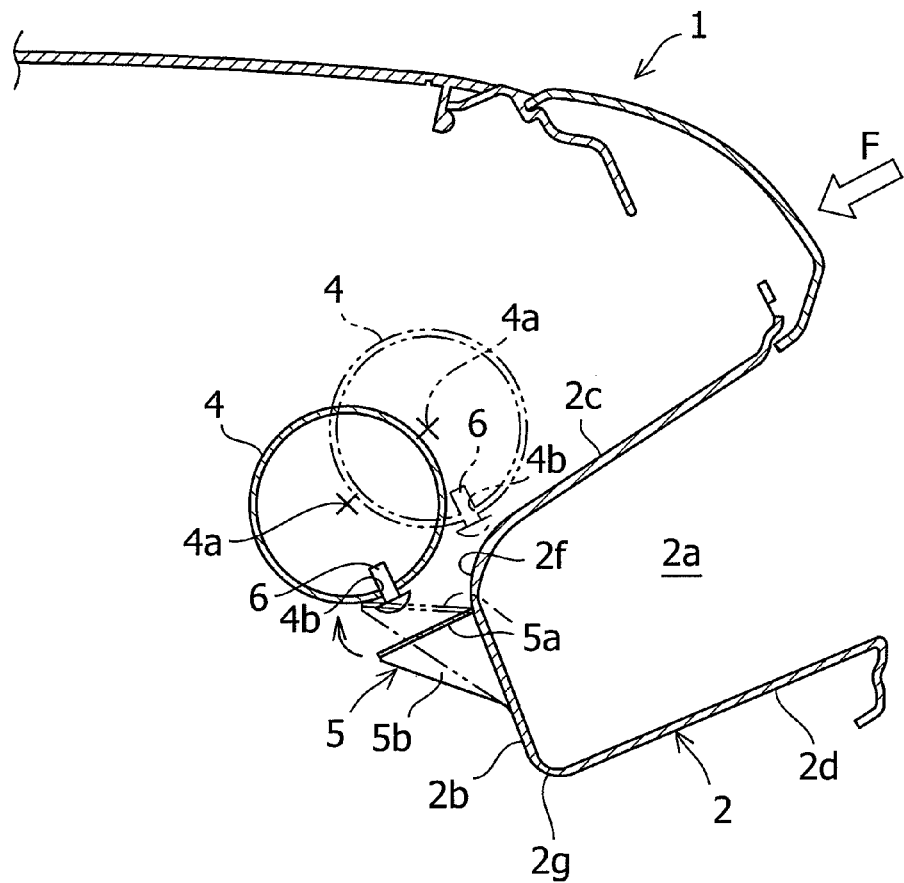
FIG. 5 is a cross-sectional view similar to FIG. 3, showing a surrounding structure of the storage compartment of the instrument panel when a force is applied from the inside of the vehicle cabin.

Referring to FIG. 5, a description is given of operations of a surrounding structure of the upper tray 2 when a force F is applied from the inside of a vehicle cabin to the I-panel 1.

The force F applied to the I-panel 1 is transmitted to the upper tray 2, and acts on the upper tray 2. In this case, the upper tray 2 moves toward the front of the vehicle. On the other hand, the S-member 4 having high rigidity, tries to stay at the initial position, so that the front edge of the attachment piece 5 attached to the S-member 4 is lifted up. If the force F continues to be applied, the screw 6 releases from the cutout part 5c, so that the attachment piece 5 uncouples from the S-member 4. Then, the upper tray 2 moves below the S-member 4.

As the mentioned above, according to the first embodiment of the present invention, based on the structure and the operations described above, the upper tray 2 of the I-panel 1 is securely supported by the S-member 4 in a normal condition. When the force F is applied from the inside of the vehicle cabin to the I-panel 1, and is transmitted to and acts on the upper tray 2, the upper tray 2 moves while deforming the attachment piece 5 attached to the S-member 4, or moves after uncoupling from the S-member 4. Furthermore, since the cross-sectional center 4a of the S-member 4 is arranged above the top edge of the front wall 2b, the upper tray 2 uncoupled from the S-member 4, moves to a position below the S-member 4. Therefore, the S-member 4 does not receive the force F applied to the upper tray 2, and can allow the force F to be transmitted to the front of the vehicle. As a result, the force F applied from the inside of the vehicle cabin to the I-panel 1, can be efficiently absorbed. Furthermore, since the front wall 2b of the upper tray 2 is not pushed by the S-member 4, the front wall 2b is prevented from moving to the inside of the vehicle cabin, and the items stored within the upper tray 2 are prevented from being thrown out to the vehicle cabin.

According to the first embodiment of the present invention, since the portion continuous with the front wall 2b is thin to form a fragile portion, the attachment piece 5 is easily deformed. This can help the upper tray 2 to move while deforming the attachment piece 5 attached to the S-member 4, or to move after uncoupling from the S-member 4.

According to the first embodiment of the present invention, since the border portion 2f between the front wall 2b and the top wall 2c, which is positioned in side of the arrangement position of the S-member 4, is formed to curve toward the front of the vehicle, the upper tray 2 can be helped to move to a position below the S-member 4 so as not to contact the S-member 4.

According to the first embodiment of the present invention, the border portion 2f between the front wall 2b and the top wall 2c, and the border portion 2g between the front wall 2b and the bottom wall 2d, are respectively formed in a smaller thickness than any of the front wall 2b, the top wall 2c, the bottom wall 2d, and the side walls 2e. This can make it less likely for the upper tray 2 to be deformed when the I-panel 1 is molded, so that the upper tray 2 can be formed in a shape exactly as intended. As a result, the advantageous effects described above can be attained effectively.

In addition, the attachment portion 5a constituting the attachment piece 5, is formed to extend from the front wall 2b of the upper tray 2 in the same direction as the direction in which the upper tray 2 is recessed. The triangular rib portions 5b constituting the attachment piece 5, extend between the front wall 2b and the respective both vehicle-width-direction edges of the attachment portion 5a. Accordingly, when the attachment piece 5 is molded integrally with the I-panel 1, the attachment piece 5 can be formed along the same direction as the direction in which a mold for the I-panel 1 including the upper tray 2 is removed. For this reason, there is no need to provide a sliding mold, or the like, to the mold for manufacturing the I-panel 1 in order to manufacture the attachment piece 5, which can reduce the costs for the mold for the I-panel 1.

Second Embodiment

A second embodiment of the present invention is described below. The basic structure of the second embodiment is similar to that of the first embodiment. The same elements as those of the first embodiment are described using the same reference numerals and names given for the first embodiment. Hereinafter, a structure different from that of the first embodiment is described.

Figure 6:
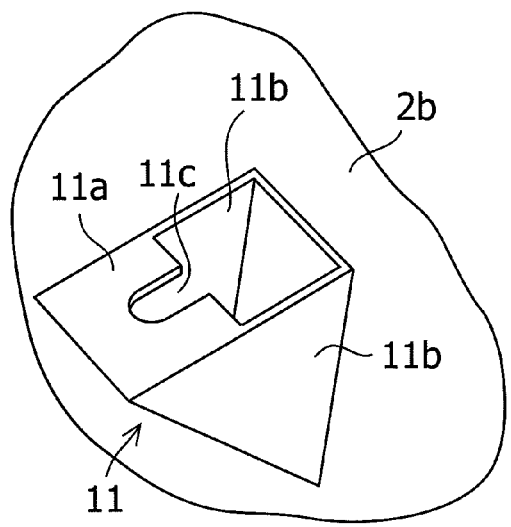
FIG. 6 is a perspective view of an attachment piece of an instrument panel in a second embodiment of the present invention.

In the second embodiment, as shown in FIG. 6, an attachment piece 11 for attaching the S-member 4 is provided so as to protrude toward the front of the vehicle. The attachment piece 11 is provided with, on a top edge thereof, an attachment portion 11a extending in the same direction as the direction in which the upper tray 2 is recessed. The attachment portion 11a is arranged apart from the front wall 2b of the upper tray 2. The attachment portion 11a is formed continuous with the front wall 2b by triangular rib portions 11b extending between the front wall 2b and both vehicle-width-direction edges of the attachment portion 11a. The attachment portion 11a is provided with a U-shaped cutout part 11c formed to be opened on a rear edge of the attachment portion 11a. A portion of the attachment piece 11, continuous with the front wall 2b of the upper tray 2, is thin to form a fragile portion.

The attachment portion 11a of the attachment piece 11 is configured to abut the S-member 4. The attachment portion 11a of the attachment piece 11 is configured to be attached to the S-member 4 by inserting a screw 6, which is a fastening member, into the cutout part 11c, and by fastening the screw 6 to the screw hole 4b of the S-member 4.

Note that the operations and the advantageous effects of the surrounding structure of the upper tray 2 in the second embodiment, are similar to those of the first embodiment.

Embodiments of the present invention have been described thus far; however, the present invention is not limited to the embodiments described above. Various modifications and alternations can be made based on the technical concept of the present invention.

For example, as a first modification of the embodiments of the present invention, the cross-sectional center 4a of the S-member 4 may be arranged below a bottom edge of the front wall 2b of the upper tray 2. Advantageous effects similar to those of the embodiments of the present invention can be attained.

As a second modification of the embodiments of the present invention, in the cases of the first embodiment and the second embodiment, only the border portion 2f between the front wall 2b and the top wall 2c, which is arranged on the side of the arrangement position of the S-member 4, may be formed to curve. In addition, in the case of the first modification described above, only the border portion 2g between the front wall 2b and the bottom wall 2d, which is arranged on the side of the arrangement position of the S-member 4, may be formed to curve. Advantageous effects, similar to those of the embodiments of the present invention, can be attained.

What is claimed is:

1. A surrounding structure of a storage compartment of an instrument panel, including the storage compartment formed in the instrument panel of a vehicle so as to be recessed toward a front of the vehicle, the storage compartment having a front wall, the front wall extending along a substantially vertical direction between a top edge and a bottom edge of the front wall, the surrounding structure further comprising:

a steering support member extending in a vehicle width direction on a forward position of the front wall of the storage compartment; and an attachment piece protruding from the front wall toward the front of the vehicle;

wherein the attachment piece has an attachment portion abutting a lower end of the steering support member;

wherein the attachment portion is provided with a U-shaped cutout part formed to be opened on a front edge or a rear edge of the attachment portion;

wherein the attachment piece is configured to be fastened to the lower end of the steering support member by a fastening member inserted into the cutout part of the attachment portion; and wherein the steering support member overlaps, along said substantially vertical direction, with the front wall of the storage compartment, and wherein a cross-sectional center of the steering support member is arranged vertically higher than the top edge of the front wall.

2. A surrounding structure of a storage compartment of an instrument panel according to claim 1, wherein a portion of the attachment piece continuous with the front wall of the storage compartment is thin to form a fragile portion.

3. A surrounding structure of a storage compartment of an instrument panel according to claim 1, wherein a border portion of the storage compartment which is positioned in an edge portion of the front wall on a side of an arrangement position of the steering support member, is formed to be curved toward the front of the vehicle.

4. A surrounding structure of a storage compartment of an instrument panel according to claim 3, wherein the border portion of the storage compartment is formed with a smaller thickness than any other walls of the storage compartment.

* * * * *